April 4, 1950 S. O. STANFIELD 2,502,601
VISIBLE PRECISION BEARING TESTING TOOL
Filed Feb. 19, 1947 2 Sheets-Sheet 1
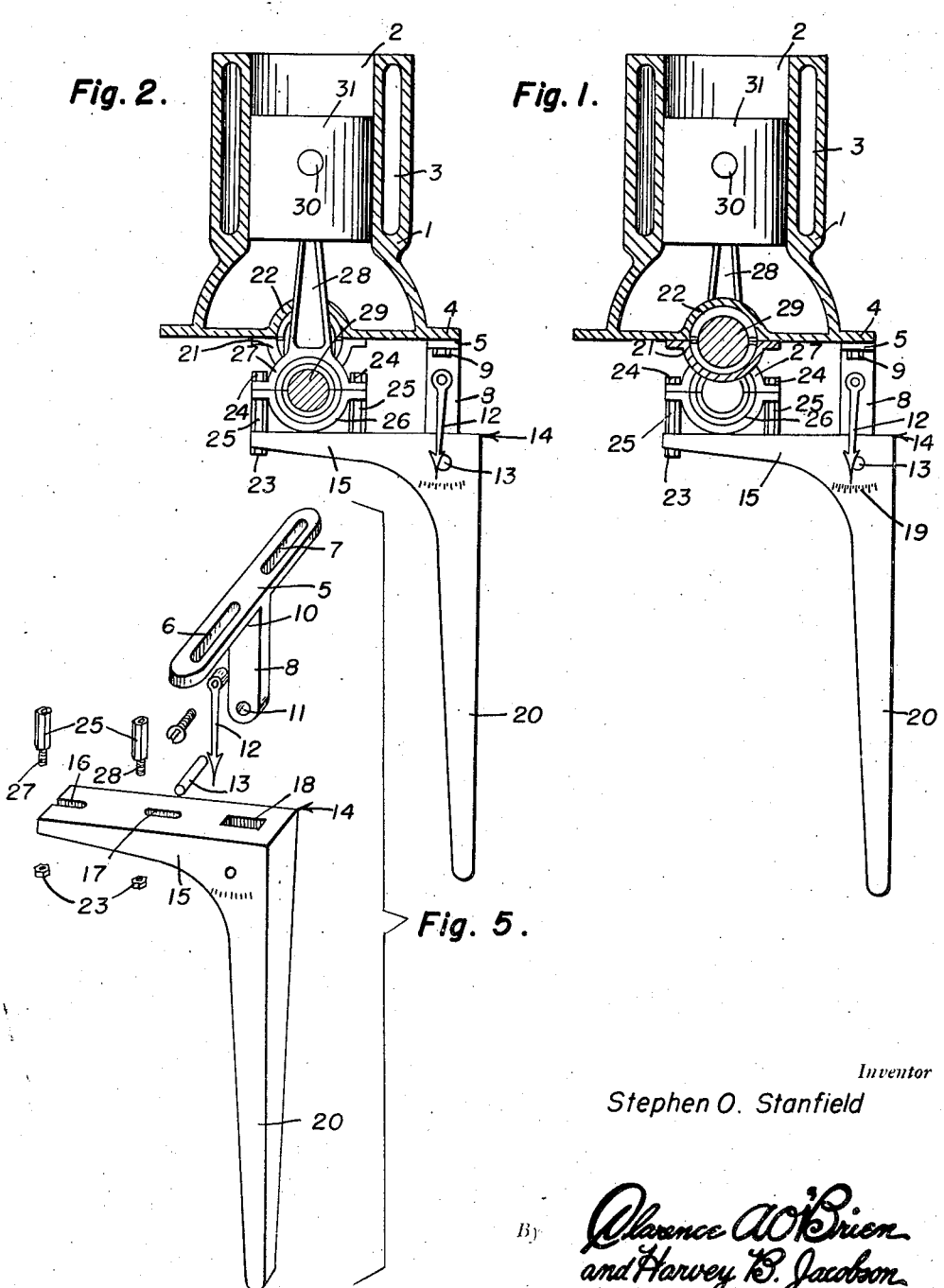
Inventor
Stephen O. Stanfield
By Clarence A. O'Brien
and Harvey B. Jacobson
Attorneys April 4, 1950 S. O. STANFIELD 2,502,601
VISIBLE PRECISION BEARING TESTING TOOL
Filed Feb. 19, 1947 2 Sheets-Sheet 2

Inventor
Stephen O. Stanfield

By Clarence A. O'Brien
and Harvey B. Jacobson
Attorneys

Patented Apr. 4, 1950

2,502,601

UNITED STATES PATENT OFFICE 2,502,601

VISIBLE PRECISION BEARING TESTING TOOL

Stephen O. Stanfield, Santa Ana, Calif.

Application February 19, 1947, Serial No. 729,513

5 Claims. (Cl. 73—119)

This invention relates to improvements in visible precision bearing testing tools.

An object of the invention is to provide an improved visible precision bearing testing tool for internal combustion engines for accurately checking the amount of looseness in the engine bearings.

Another object of the invention is to provide an improved visible precision bearing testing tool for checking the amount of looseness in internal combustion engine bearings, said tool including a bracket, a bell crank lever, a precision indicating needle and a dial, with bolts for attaching the testing tool.

A further object of the invention is to provide an improved form of visible precision bearing testing tool for internal combustion engine bearings which will quickly and accurately test and visibly indicate the condition of the main bearings and connecting rod bearings, and also test for piston slap and tightness of the wrist pins and for connecting rod bossing.

A still further object of the invention is to provide an improved form of visible precision bearing testing tool for internal combustion engine bearings which will be highly efficient in operation, and relatively inexpensive to manufacture and produce.

Other objects will appear as the description proceeds.

In the accompanying drawings which form a part of this application,

Figure 1 is a sectional view through an internal combustion engine block with its oil pan removed showing the improved visible precision bearing testing tool in position thereon for testing the main crank shaft bearings;

Figure 2 is a similar view to Figure 1, but with the visible precision bearing testing tool in position for testing a connecting rod bearing;

Figure 5 is an exploded view of the several parts making up the improved visible precision bearing testing tool;

Like characters of reference are used throughout the following specification and the accompanying drawings to designate corresponding parts.

Figure 3:
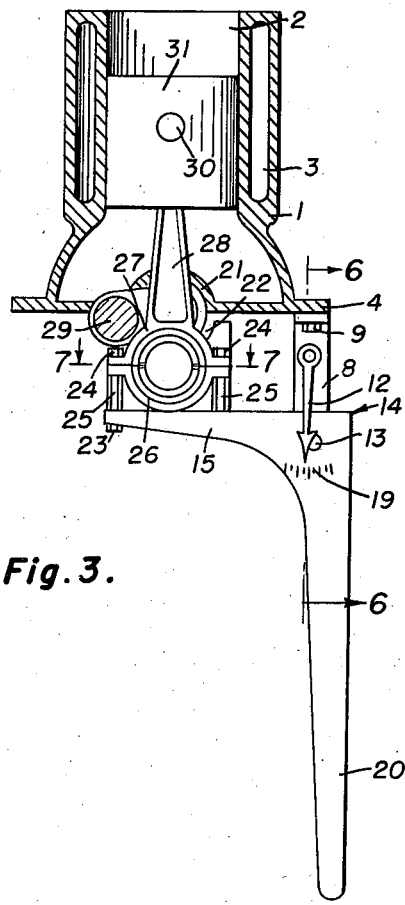
Figure 3 is a similar view to Figure 1, but with the visible precision bearing testing tool in position for testing a wrist pin.

In carrying out the invention, there is provided and illustrated an internal combustion engine cylinder block generally designated by the reference numeral 1 having the usual cylinders 2, water jacket 3 and bottom supporting flange 4 to which the oil pan (not shown) will be attached and secured.

For testing the engine bearings, the oil pan (not shown) will first be removed, and for testing the main bearings, the T-shaped bracket which includes the cross piece 5 formed with the spaced slots 6 and 7 and the depending arm 8, will be attached by the bolts 9 to the flange 4 on the lower edge of the engine cylinder block 1. Upper and lower apertures 10 and 11 are formed through the depending arm 8 of the bracket, and serve to respectively support the precision indicating needle 12 and the hinge pin 13.

A bell crank lever generally designated by the reference numeral 14 comprises a transversely or longitudinally extending arm 15 which is slotted at 16 in its outer end, and is also slotted at 17 adjacent the middle thereof. A rectangular shaped slot 18 is formed in the inner end of said arm 15, and is adapted to receive the lower end of the depending arm 8, said bell crank lever 14 being pivotally supported upon the hinge pin 13 which extends through the arm 8 of the bracket which is attached to the flange 4 about the engine cylinder block 1.

The precision indicating needle 12 overlies the arcuate calibrated dial section or quadrant 19 suitably formed on the surface of the bell crank lever 14.

The lower or depending vertical end 20 of the bell crank lever 14 extends downwardly a considerable distance below the hinge pin 13 and is longer than the horizontal or longitudinal portion 15 of said bell crank lever 14 to provide a hand engaging operating lever which will be moved or rocked back and forth while making a test to indicate any degree of looseness of the bearing upon the scale 19.

In making the connecting rod bearing test, the nuts 23 on the connecting rod cap bolts 24 are removed and the stud extensions 25 are threaded on the bolts 24 with the reduced lower threaded ends 27 and 28 of the studs 25 disposed in and through the slots 16 and 17 in the arm 15 of the bell crank lever 14 and the nuts 23 threaded on the threaded ends 27 and 28 of said studs 25, whereupon rocking back and forth on the depending hand lever 20 will give a visible indication upon the scale 19 by the needle 12 of any looseness in said connecting rod bearings.

When making the main bearing test, the bell crank lever is left attached in the same or identical manner as when making the connecting rod bearing test, only a stronger rocking force on the hand lever 20 will move or jump the crank shaft up and down in the main bearing if there is looseness in the main bearing.

Hence, it will be seen that a moderate force on the hand lever 20 will indicate by the needle 12 and the quadrant 19 if there is looseness in the connecting rod bearing, whereas a looseness in the main bearing is shown by an identical assembly of the testing tool except that a stronger force will be applied to the hand lever 20 to add to the movement and will be noted by the added movement of the indicating needle 12 in connection with the quadrant 19.

In the main bearing test, the caps 21 of the main bearings 22 are not molested in this test for main bearing looseness.

In making the test for looseness of wrist pins as illustrated in Figure 3 of the drawings, the connecting rod 28 will be removed from the crank shaft 29, and a light rocking motion of the hand lever 20 will cause the wrist pin 30 to jump back and forth in its bearing according to its amount of looseness, being sure not to rock the lever 20 hard enough to move the piston 31. The amount of looseness can be instantly read upon the scale quadrant 19.

Figure 4:
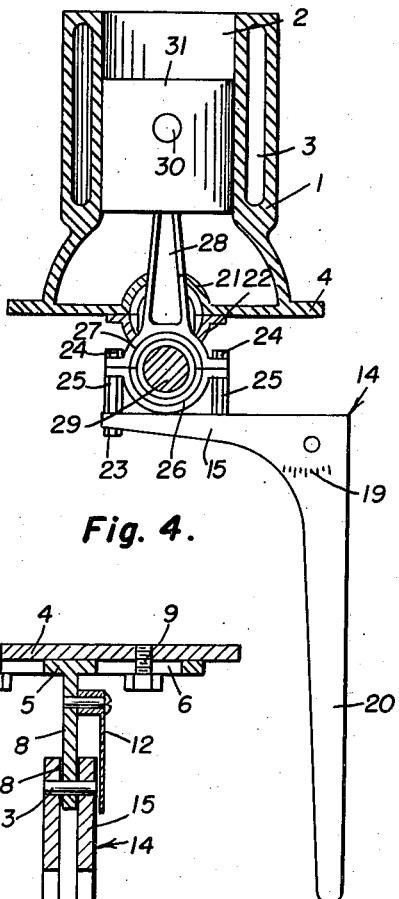
Figure 4 is a similar view to Figure 1, but with the visible precision bearing testing tool in position for testing for piston slap.
Figure 6:
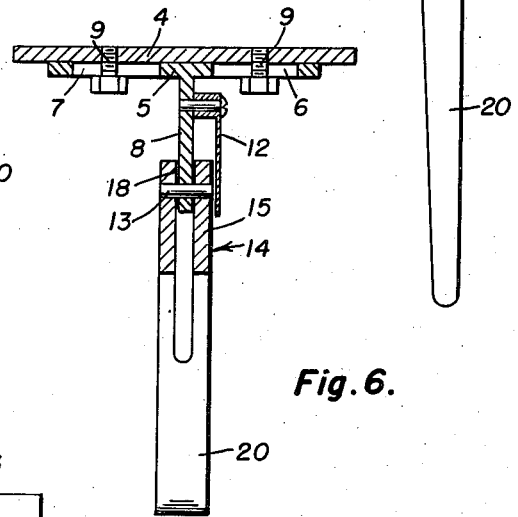
Figure 6 is a sectional view taken on the line 6—6 of Figure 3.
Figure 7:
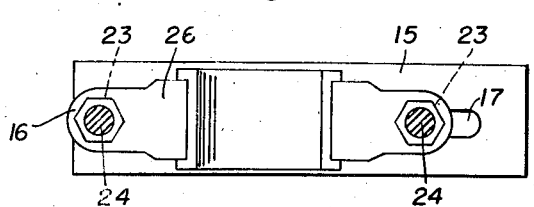
Figure 7 is a sectional view taken on the line 7—7 of Figure 3.

The piston slap test is shown in Figure 4, wherein the bracket is unbolted from the crank case flange 4 and the bell crank lever 14 is connected to the connecting rod bearings. Since the crank journal acts as the fulcrum when the lever 20 is rocked back and forth, the piston 31 may be heard and seen to slap from side to side in the cylinder 2 according to the amount of looseness. The upper dead center position being preferable for this test as the largest amount of looseness will there be shown.

To test for connecting rod bossing, the assembly is arranged as in the test for piston slap, only the hand lever 20 will be rocked back and forth in a direction parallel with the crank shaft 29. If there is bossing, the upper end of the connecting rod may be both seen and heard striking against the piston boss.

By using the improved visible precision bearing testing tool in the manner hereinbefore described, a mechanic may ascertain quickly and accurately the condition of the several bearings of an internal combustion engine, and take the proper steps to correct any necessary repair thereto.

From the foregoing description, it will be seen that there has been devised and provided a highly efficient visible precision bearing testing tool which will be accurate and relatively inexpensive to manufacture and produce.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. In combination with a cylinder block of an internal combustion engine, of a visible precision bearing testing tool including a bracket detachably secured to said cylinder block, a bell crank lever pivotally supported on said bracket, a pointer and scale respectively disposed on said bracket and bell crank lever, means on one arm of said bell crank lever for attaching the same to an engine bearing, and the other arm of said bell crank lever being rockable to cause the looseness between the bearing assemblies to be indicated by said pointer on said scale.

2. In combination with a cylinder block of an internal combustion engine, of a visible precision bearing testing tool including a T-shape bracket detachably secured to said cylinder block, a bell crank lever having a horizontal arm and a vertical arm pivotally supported on said T-shape bracket, a pointer and scale respectively disposed on said bracket and bell crank lever, the horizontal arm of said bell crank lever being slotted, means engageable in said slots for attaching said arm to an engine bearing, and said other arm of the bell crank lever being rockable to cause the looseness between the bearing assemblies to be indicated by said pointer on said scale.

3. In combination with a cylinder block of an internal combustion engine, of a visible precision bearing testing tool comprising a support, means for removably securing the support to the cylinder block, lever means pivotally carried by the support, attachment means for securing the lever means to an engine bearing, indicia provided on the lever means, and means carried by the support registering with the indicia to indicate the looseness between the bearing assemblies as the lever means is actuated.

4. The combination of claim 3 wherein said lever means includes a longitudinal slot, and said support includes a depending arm pivotally mounted in the slot provided in the lever means.

5. In combination with a cylinder block of an internal combustion engine, of means for testing and indicating the looseness of the main crank shaft bearing of the engine, said means comprising a lever pivotally secured to the cylinder block, means for removably securing the lever to the main crank shaft bearing of the engine, said lever being movable to effect a force on the crank shaft bearing of the engine, and means for indicating the degree of movement of the main crank shaft bearing of the engine relative to the cylinder block.

STEPHEN O. STANFIELD.

REFERENCES CITED

The following references are of record in the file of this patent:

UNITED STATES PATENTS

| Number | Name | Date |
|---|---|---|
| 1,753,575 | Milne | Apr. 8, 1930 |

FOREIGN PATENTS

| Number | Country | Date |
|---|---|---|
| 97,468 | Germany | May 29, 1897 |